United States Patent [19]

Branigin et al.

[11] 4,358,829
[45] Nov. 9, 1982

[54] DYNAMIC RANK ORDERED SCHEDULING MECHANISM

[75] Inventors: Michael H. Branigin, Penllyn; Francis P. Knebel, Philadelphia; Gerald V. McClellan, Graterford, all of Pa.

[73] Assignee: Sperry Corporation, New York, N.Y.

[21] Appl. No.: 140,367

[22] Filed: Apr. 14, 1980

[51] Int. Cl.³ .................................. G06F 7/00
[52] U.S. Cl. .................................. 364/900
[58] Field of Search ... 364/200 MS File, 900 MS File

[56] References Cited

U.S. PATENT DOCUMENTS

| | | | |
|---|---|---|---|
| 3,599,162 | 8/1971 | Byrns et al. | |
| 3,601,809 | 8/1971 | Gray et al. | |
| 3,638,198 | 1/1972 | Balough, Jr. | 364/200 |
| 3,774,163 | 11/1973 | Recoque | 364/200 |
| 3,786,432 | 1/1974 | Woods | 364/200 |
| 3,789,365 | 1/1974 | Jen et al. | |
| 3,916,385 | 10/1975 | Parmer et al. | |
| 4,054,945 | 10/1977 | Ichiko et al. | |
| 4,060,849 | 11/1977 | Bienvenu et al. | |
| 4,177,513 | 12/1979 | Hoffman et al. | 364/200 |

OTHER PUBLICATIONS

Gilbert, D. C. et al., "Priority Control Method for a Resource Partitioning System", IBM Tech. Disc. Bull., vol. 18, No. 6, Nov. 1975, pp. 1942–1947.
Boggs, J. K. et al., "Double-Indexed Priority Queue", IBM Tech. Disc. Bull., vol. 18, No. 2, Jul. 1975, pp. 378–379.
Myers, L. M., "Fast Access Priority Queuing Technique", IBM Tech. Discl. Bull., vol. 16, No. 8, Jan. 1974, pp. 2479–2482.

Primary Examiner—Charles E. Atkinson
Assistant Examiner—Thomas M. Heckler
Attorney, Agent, or Firm—James R. Bell; Marshall M. Truex

[57] ABSTRACT

A mechanism is provided which permits the insertion of elements into a list of positions determined by the rank of the elements and allows deletion of elements only from the top of the list. The arrangement provides dynamic aging of the priorities of the elements entered into the list.

11 Claims, 3 Drawing Figures

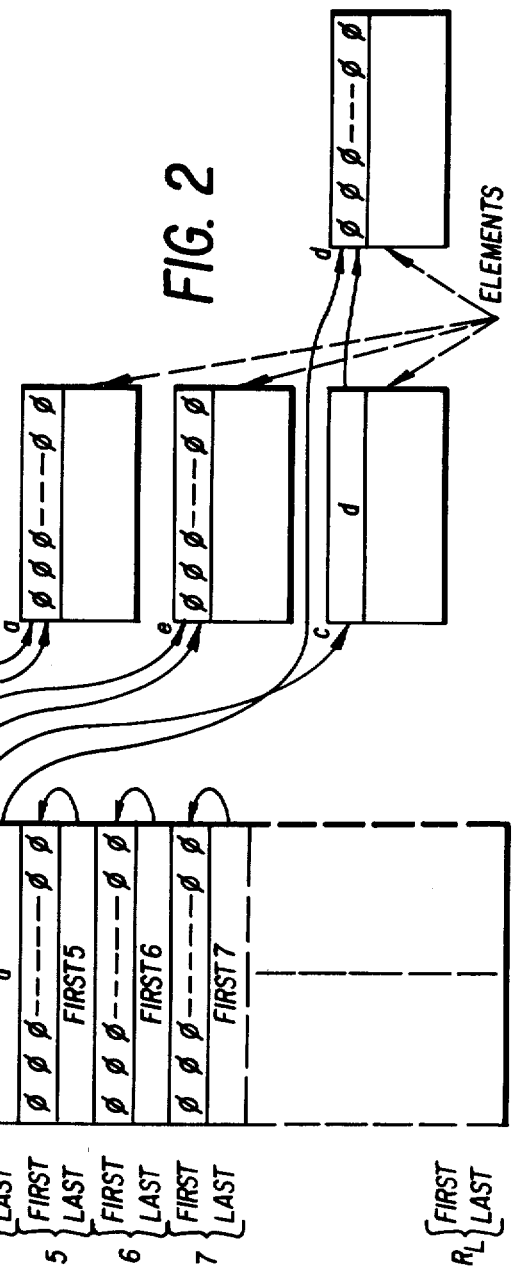
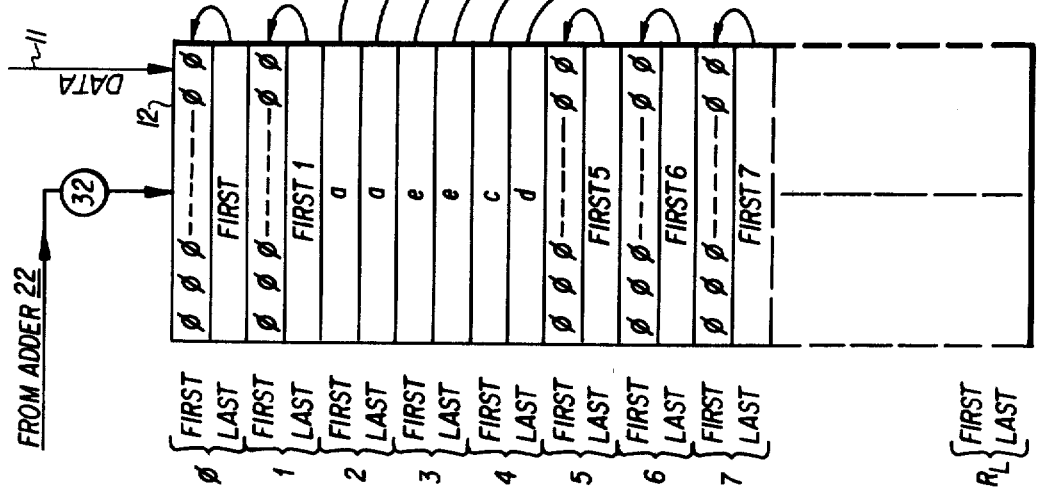
FIG. 3
FIG. 2

DYNAMIC RANK ORDERED SCHEDULING MECHANISM

BACKGROUND OF THE INVENTION

The present invention relates to a scheduling, dispatching and data management system in which information is enqueued in a table based on a numeric priority value and dequeued only from the top of the table.

It is known that information can be inserted in a table based on some numeric priority value and removed therefrom on the same basis. One of the difficulties of the prior art is that if you have a table that is, for example, ten entries long, and you have only three entries therein at random priorities, it is difficult to locate an entry. Typically, this is accomplished by a search through the entire table which is only sparsely filled with information in order to find the entry.

A further disadvantage of the prior art data management systems is that they do not provide for the aging of entries. Assume for example a communications system for handling high speed lines such as data processors and lower speed lines such as teletype equipment. Generally, the higher speed lines are given the highest priority while the lower speed lines are given the lowest priority. With a straight priority mechanism the higher speed lines might continuously occupy the communication system and leave no time for servicing the lower speed lines. Therefore, it is desirable that some means be provided for "aging" lower priority requests so that they eventually receive service rather than being totally neglected.

BRIEF SUMMARY OF THE INVENTION

An object of the present invention is to provide a data management system wherein an entry is inserted in a queue at a given priority and a given placement based on the numeric activity that has preceded that entry.

An object of the present invention is to provide a data management system which permits the insertion of elements into a list of positions determined by the element's rank or priority and allows deletion of elements only from the top of the list.

A further object of the present invention is to provide a dynamic rank ordered scheduling mechanism including storage means for storing a queue control block and a table of elements, the queue control block including a value B representing a pointer to the table position from which the last dequeue occurred, a value N representing a count of the priority levels which have enqueued elements, a value K representing the starting address of the table, and a bit map having a binary bit position corresponding to each of a plurality of priority levels, means responsive to a dequeue instruction for decoding the bit map to produce a numeric value D representing the highest level priority of the elements in the table, the value D being entered into the storage control block for subsequent use as the value B means responsive to an enqueue instruction for summing K, N, B and P to produce an address in the table where an element is to be entered; and, means for applying the address to the storage means. On an enqueue operation, N is incremented and a bit in the bit map is set if the element being entered is the first element of its rank in the table. On a dequeue operation N is decremented and a bit in the bit map is cleared or reset if the element being dequeued is the last element of its rank in the table. The entry dequeued is taken from address K+D.

Other objects of the invention and its mode of operation will become apparent upon consideration of the following description and the accompanying drawings.

BRIEF DESCRIPTION OF THE DRAWINGS

FIG. 2 illustrates a list head table and associated elements; and,

FIG. 3 is a chart illustrating values generated by a dynamic rank ordered scheduling system during a sequence of enqueue and dequeue operations.

DETAILED DESCRIPTION OF THE INVENTION

Figure 1:
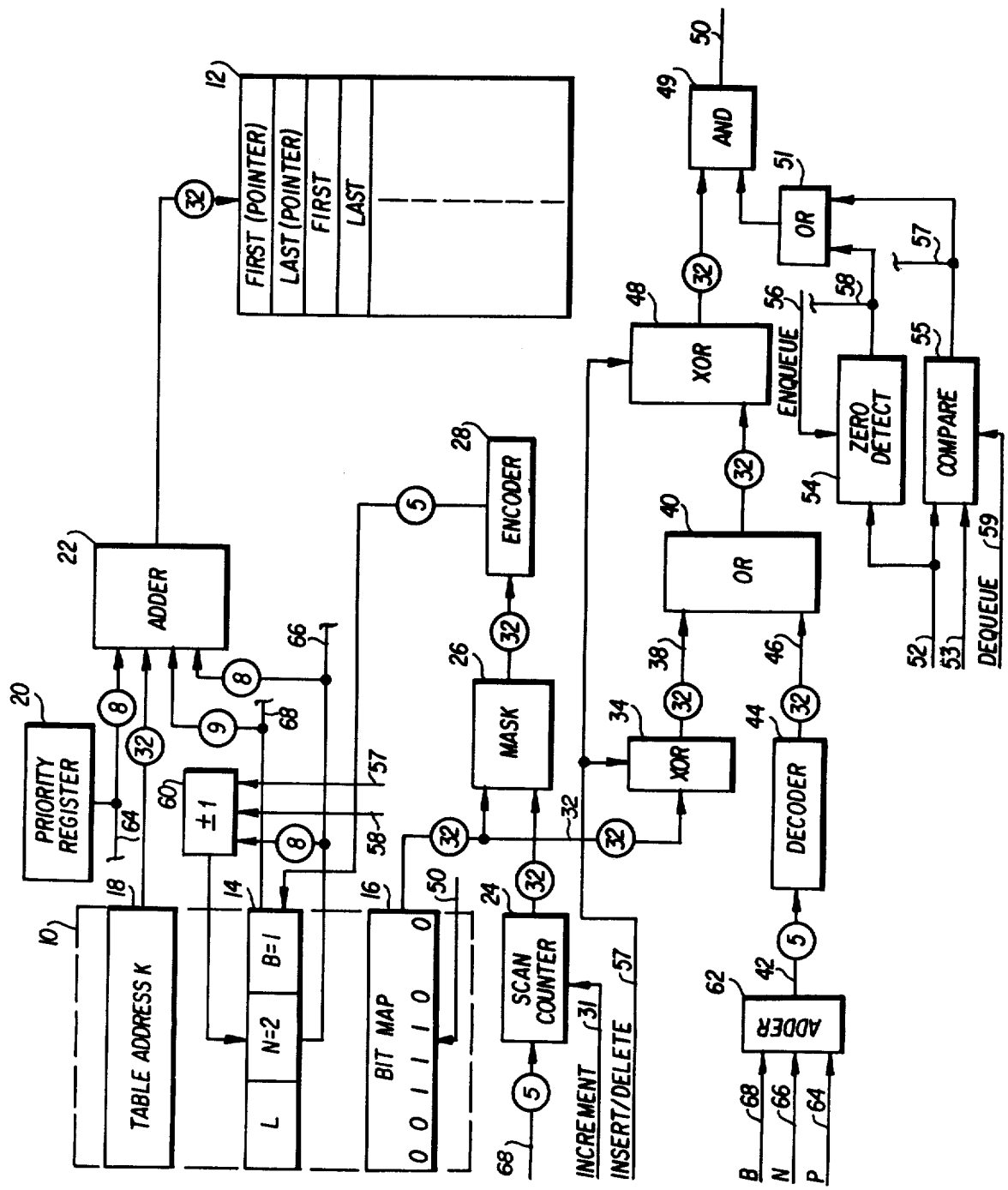
FIG. 1 is a block diagram of a rank ordered dynamic scheduling mechanism.

As shown in FIGS. 1 and 2, a dynamic rank ordered scheduling system constructed in accordance with the principles of the present invention includes storage means for storing a queue control block 10, a list head table 12, and a plurality of data elements, four of which are illustrated in FIG. 2.

As best shown in FIG. 2, the table 12 is a conventional list head table for controlling various types of queues or lists in a manner well known in the art. Each position or rank in table 12 includes two words which serve as list head pointers. The first word is a pointer to (i.e. the address of) the first element in a list of elements of a given priority level or rank. The second word in each position of table 12 is a pointer to the last element in the list of elements at the same priority level or rank. If there are no elements currently stored having the associated rank, the first word in table 12 for that rank is zero and the second word points to the first word. If there is only one element in the list at a particular rank, both words for that rank in table 12 point to that element since it is both the first and last element in the list.

An element is typically a contiguous fixed number of locations in storage. For purposes of the present description, it may be assumed that each location stores a word although it may only by a byte-size word. The first word in each element is a pointer to the next element in the list at the same rank. If an element is the last element or the only element of a given rank in a list, its pointer word is zero.

The queue control block 10 comprises a plurality of words some of which are not shown in FIG. 1 because they are not germane to the present invention. However, the queue control block does include a first word 14 having three fields designated B, N and L. B is a multi-bit field which is a numeric pointer to the position (i.e. priority level or rank) in table 12 from which the last dequeue occurred. The N field is a binary count of the priority levels which have enqueued elements. The L field is a multi-bit field which defines the maximum permissible priority value. This field does not enter into the calculation of an enqueue or dequeue address and is not mentioned further. However, it should be noted that the number of ranks R in table 12 should be at least twice as great as L.

The queue control block also includes a word 16 referred to as a bit map. The bit map has a binary position for each rank or priority level. If a bit in the bit map is set (binary 1) it means that there are elements of that rank still enqueued.

The queue control block also contains a multi-bit word 18 which defines the base or beginning address for the table 12.

Register 20 represents one of a plurality of priority registers. A priority register 20 is provided for each of the different systems involved in the priority scheme. For example, for the communications system mentioned above there may be a priority register for each of the lines and the value stored in the priority (P) register represents the priority assigned to that particular line. The lowest value 0 represents the highest priority while higher numbers represent lower priorities. When an entry is to be made into table 12 (that is, into an element controlled by table 12) from a particular line, an enqueue instruction and the queue control block cause the contents of the associated priority register to be read out to an adder 22. At the same time, the table address K and the values N and B are read out to the adder to generate the address where the entry is to be inserted in the table. Thus, the absolute address of the insertion point I is defined by the equation:

$$I = K + B + N + P$$

On a dequeue operation, the bit map word is scanned to locate the highest order rank in table 12 that is occupied. The scanning operation produces a value B which is then added to K to gain entry to the table. A scan counter 24, a mask circuit 26 and an encoder 28 are provided for developing a value for the field B in word 14 during a dequeue operation. The scan counter 24 may be loaded with any specified value from a bus 68 and counts up from the value with which it is loaded as incrementing pulses are applied to it over a lead 31. The bus 68 may, in fact, receive the B field from word 14. As the counter increases its count it selectively energizes first one and then another of 32 output leads each of which is connected to the mask circuit 26. The mask circuit 26 may comprise 32 ANDs each having one input connected to an output of scan counter 24 and another input connected to receive one bit position from the bit map word 16. Assume for the moment that scan counter 24 is loaded with a zero value and begins counting. When it reaches a count corresponding to the highest priority level represented by a one bit from bit map word 16, mask circuit 26 produces an output signal on one of 32 output leads. These leads are connected to encoder 28 which generates a 5-bit binary code D representing the highest priority level (highest level containing a one) in the bit map word 16. The output of encoder 28 is stored in the B field of word 14 during execution of a dequeue instruction for reasons which will later become clear.

When executing a dequeue instruction, and the dequeued element is the last element contained in a list it is necessary to delete (change from 1 to 0) the bit in the bit map word 16 corresponding to the rank of the list. This is accomplished by a circuit including a decoder 44, Exclusive ORs (XORs) 34, ORs 40 and XORs 48. The bit map word is applied by way of a bus 32 to a set of 32 XORs 34. If a bit in the bit map word is to be deleted a signal (binary 1) is applied to a lead 57 as subsequently described. Lead 57 is connected to all of the XORs 34. This has the effect of complementing each bit on bus 32 and the complement values are applied over a bus 38 to the set of 32 ORs 40.

A binary coded value representing the bit position in the bit map word which it is desired to change, is derived by adding the B and N fields of word 14 and a priority value P derived from a priority register 20. The values are applied to adder 62 which produces a binary coded output that is applied over a bus 42 to the decoder 44. This decoder decodes the binary value on bus 42 and applies a binary 1 to the OR in the set of ORs 40 corresponding to the bit position to be changed. The outputs of ORs 40 are then applied to the set of 32 XORs 48. These XORs also receive the signal on lead 57 and, if a deletion operation is taking place, the outputs of XORs 48 appearing on bus 50 is the complement of the value obtained from ORs 40. Thus, there appears on bus 50 the value originally applied to bus 32 but with the single bit specified by the value on bus 42 being set to 0, provided a set of 32 ANDs 49 is enabled as subsequently described.

When an element is inserted in a list of a given rank, and there were previously no elements in that list, the bit map word should be changed by inserting (changing from 0 to 1) a bit in the position corresponding to the rank of the list. The operation is essentially the same as for a deletion operation. However, in this case the signal on lead 57 is a logical zero so that the bit map word on bus 32 passes through XORs 34 without change. The decoder 44 produces a binary one for that position which is to be set. The outputs from XORs 34 and decoder 44 are combined in ORs 40 and pass through XORs 48 without change so that the resulting bit map word applied to ANDs 49 corresponds to the bit map word originally applied to bus 32 but with the bit specified by the value on bus 42 being changed to a binary one.

TYPICAL EXAMPLE

FIG. 3 is a table illustrating the various values generated for B, N, I and the bit map word during a sequence of enqueue and dequeue operations. As will become evident from the following discussion, the values illustrated for N, B and the bit map in FIG. 1 and the values in table 12 and the elements a, e, c and d shown in FIG. 2 actually represent the state of the system at time t=6 in the table of FIG. 3. Initially, it is assumed that there are no enqueued elements hence the first word in each rank of table 12 is 0 and the second word in each rank points to the first word.

Assume that at time t=0 a communication line having a priority P=2 makes a request to enqueue an element. The enqueue request acts through a control mechanism (not shown) of conventional design to read out the priority assigned to the requesting line from its associated priority register 20. At the same time, the values N and B (both assumed to initially be 0) are read out of the queue control word 14 while the table address K is read out of the queue control word 18. The table address K, the output P of the priority register 20, and the values N and B are summed in adder 22 to address the list head table 12. Since the table address K is merely the base address for table 12, it will be ignored in the following discussion. In addition, because the operation of the list head table 12 in controlling the enqueuing of elements is well known in the art, the details and workings of this apparatus are not considered in the following example.

Assuming that the communication line making the enqueue request has a priority of 2, and assuming N and B are initially 0, the insertion point I in table 12 is $B+N+P=0+0+2=2$. Thus, at time t=0 the element a is enqueued on rank 2 of table 12. Since element a is the first element to be enqueued on rank 2, it is necessary to increment N and set bit 2 of the bit map word 16.

N may be changed by sensing the first word of the rank into which an entry is being inserted, the sensing being made prior to the insertion. The first word is applied over a bus 52 to a zero detector 54 which is enabled only during enqueue operations. If the first word of the rank is a 0 then an output signal is generated on a lead 58 and applied to an increment/decrement circuit 60. The increment/decrement circuit also receives the N-field from word 14 and increments this field by 1 and returns it to the N-field of the word after the first element has been enqueued on a given rank.

The bit map word, which has all zeroes at the beginning of t=0 should have bit position 2 modified since the element a is the first element to be enqueued at rank 2. The output of zero detector 54 is applied through OR 51 to enable the set of ANDs 49. The signal on lead 57, false at this time, is applied to XORs 34 and XORs 48 while the values B+N+P are applied to adder 62. Adder 62 produces the binary sum of B+N+P which is 2, and decoder 44 decodes this value to enable a single OR 40. The bit map from word 16 of the queue control block is applied to XORs 34 which also receive the false signal on lead 57. Thus, the output of XORs 34 is all zeroes. The resulting output from ORs 40 is a bit map word which is all zeroes except for bit position 2. This word is applied to XORs 48 which also receive the false or 0 signal on lead 57. Thus, the output of XORs 48 is also a bit map word wherein all bits are 0 except bit position 2. This word is passed through the ANDs 49 to the bus 50 and returned to the queue control block as the new bit map word 16. Thus, at t=1 the bit map word has the value shown in FIG. 3.

At time t=1 a second communication line having a parity P=0 makes an enqueue request to enqueue an element b. The priority associated with the requesting line is read out by a priority register 20 as are the words 14 and 18 from the queue control block. Since B=0, N=1, and P=0, the insertion point I in table 12 equals 1. Thus, element b is enqueued on rank 1. Since this is the first element enqueued on rank 1, it is necessary to increment N and change bit position 1 of the bit map to a 1. The operation is the same as for the enqueuing of element a except that the previously set bit 2 of the bit map word remains set while bit 1 of the word is also set. N is incremented to 2.

At time t=2 a communication line having a priority P=2 makes an enqueue request to enqueue an element c. The value B is still 0, N is now 2, and since the parity is 2, the insertion point I is calculated as 4. Thus, element c is enqueued on rank 4. The N-field of word 14 is incremented to 3 and bit 4 of the bit map word is set.

At t=3 a communication line having a priority P=1 makes an enqueue request to enqueue an element d. Since P=1, B=0 and N=3, the insertion point I again equals 4. Thus, element d is enqueued on rank 4 behind element c. Since this is not the first element enqueued on rank 4 (element c is already enqueued there) the bit map word should not be changed and N should not be incremented. When the first word of rank 4 is sensed, it does not contain a 0 but instead contains the pointer to element c. Thus, the zero detector 54 of FIG. 1 does not produce an output through OR 51 to enable ANDs 49. This prevents modification of the bit map word. Also, the lack of a true signal on lead 58 prevents the incrementor/decrementor 60 from modifying (incrementing) N and it is left unchanged in word 14.

At time t=4 a communication line makes a dequeue request. The bit map word is applied to mask circuit 26 and scan counter 24 is loaded with the value from the B-field of word 14 (now 0). The counter is then successively incremented. The scan counter acting through mask circuit 26 successively tests each bit of the bit map word starting at bit 0 and continues until it senses the first one bit. In the assumed example, this one bit is contained in bit position 1. When this bit is sensed it enables encoder 28 which produces a binary code representing bit position 1. This value is then stored in the B-field of word 14. The B-field is then read out to adder 22 together with the table address K. The N-field and the priority register inputs to the adder 22 are inhibited during a dequeue instruction. Thus, adder 22 produces an address which accesses rank 1 of the table 12. Referring to FIG. 3, it is seen that the only element in rank 1 (I=1) is element b. Thus, element b is the element that is dequeued.

Since element b is the last (only) element on rank 2, it is necessary to decrement N and delete bit position 1 of the bit map word. Prior to the dequeuing of element b, the first and second words of rank 1 are compared by comparator 55 and since there is only one element enqueued on this rank the two words are equal. The comparator produces an output signal on lead 57 which is applied to the incrementor/decrementor 60 so that the value N is decremented by 1 and returned to queue control block word 14. The signal on lead 57 is applied to the two sets of XORs 34 and 48. The bit map word is applied to XORs 34 and because the signal on lead 57 is true the bits in the bit map word are all inverted and applied to the ORs 40. The value B (now 1) is applied to adder 62 while the dequeue instruction inhibits (by gating not shown) the application of N and P to the adder. Thus, the adder produces a binary indication of 1 and this is decoded by decoder 44 to apply a 1 to the OR 40 for bit position 1. The outputs from the ORs are then applied to XORs 48 and since the Insert/Delete signal is true the outputs of ORs 40 are complemented by XORs 48. Thus, the bit map word obtained from XORs 48 has the value shown in FIG. 3 on the line t=5. This bit map word is applied to ANDs 49 which are enabled at this time by the output of the comparator circuit 55 which has stored during the dequeue operation an indication that the first and last words of rank 1 of table 12 were equal.

At time t=5, a communication line having a priority P=0 makes an enqueue request for the purpose of storing element e. At this time B=1 and N=2, and since P=0, the insertion point in table 12 is rank 3. Element e is enqueued and since it is the first in rank 3, it is necessary to increment N and set bit position 3 of the bit map word. This is accomplished as previously described.

At time t=6 a communication line makes a dequeue request. The value from the B-field of word 14 (now 1) is loaded into scan counter 24 and it is incremented to scan for the first position in the bit map word containing a 1. From the table of FIG. 3 it is seen that the first 1 occurs in bit position 2 of the bit map word. Thus, when the counter reaches a count of 2 the mask circuit 26 produces an output signal which is encoded by encoder 28 to store back in the B-field the binary value 2. The B-field and the table address K are then applied to adder 22 while the output of priority register 20 and the N-field are inhibited. Thus, adder 22 produces the address of rank 2 of table 12. Element a is the only element enqueued on rank 2 hence after element a is dequeued N is decremented and the bit position 2 of the bit map word is reset. Therefore, at the end of the interval t=6, B and N both contain the binary equivalent of 2.

At t=7 a communication line again makes a dequeue request. The operations which occur are essentially the same as occurred at t=6. However, the counter 24 starts at bit position 2 and scans only one position until it finds a 1 in bit position 3 of the bit map word. The resulting output from mask circuit 26 is encoded by encoder 28 to store a binary 3 in the B-field of word 14. This B-field is then read out with table address K through adder 22 to address rank 3 of table 12. This rank contains only the element e hence this element is dequeued. Since it is the last element in rank 3, N is decremented by 1 and bit position 3 of the bit map is cleared. Thus, at the end of the interval t=7, B=3 and N=1.

At time t=8 a communication line makes another dequeue request. The scan counter 24 starts at bit position 3 and scans only one position before it finds a 1 in bit position 4 of the bit map word. The mask circuit 26 produces an output signal that is encoded by encoder 28 to store the binary value 4 in the B-field of word 14. The B-field is then read out to adder 22 together with the table address K to address rank 4 of table 12. Thus, the first element in this rank, element c, is dequeued. However, since this is not the last element on this rank, the value N is not changed and the bit map word also remains unchanged. At the beginning of t8 comparator 55 detects an inequality between the first and last words of rank 4 and zero detector circuit 54 detects that the first word is not 0 hence there is no output from OR 51 to enable ANDs 49. This prevents the changing of the bit map word. In addition, since the outputs from zero detector 54 and comparator 55 are both false the incrementor/decrementor circuit 60 does not modify the N-field.

At time t=9 another communication line makes a dequeue request. The value in the B-field of word 14 is read out to counter 24 and since B=4 and bit position 4 of the bit map word is a 1, the mask circuit 26 immediately produces a signal to encoder 28 so that the value 4 is again returned to the B-field of word 14. The B-field is then read out to adder 22 together with the table address K, and the output of adder 22 addresses rank 4 of table 12. Element d is the only element stored on this rank hence it is dequeued. Since element d is the last element of the rank it is necessary to reset bit 4 of the bit map word and decrement N. It is believed that the manner in which these operations are carried out should be evident from the foregoing description. Thus, at the end of t=9 all of the elements have been dequeued and bit map word contains all zeroes.

For the sake of simplicity, the foregoing description makes reference to "another communicating line." It should be understood that the dequeues could be initiated by requests from a single communication line or from some other data handling mechanism.

From the foregoing description it is seen that the present invention extends the teaching of the prior art with respect to queue mechanisms by providing means for modifying the enqueuing and dequeuing sequences so that low priority entries "move" toward the dequeuing position in accordance with their "aging" where age is measured in terms of queue activity.

While a specific embodiment of the invention has been described in some detail, it will be understood that various modifications, substitutions and additions may be made without departing from the spirit and scope of the invention as defined by the appended claims. For example, for purposes of clarity the queue control block 10 is illustrated as having a single table address K and a single bit map word 16. In some systems it may be desirable to provide plural table address words and plural bit map words. In addition, the B and N-fields shown in FIG. 1 are much larger than necessary for a single 32 bit bit map word such as the word 16 shown in FIG. 1. Where more than 32 priority levels are specified, the bit map word may be replaced with a word specifying the address of a larger bit map. Other modifications will be obvious to those skilled in the art.

The embodiments of the invention in which an exclusive property or privilege are claimed are defined as follows:

1. In a dynamic rank ordered scheduling mechanism for enqueuing data elements on and dequeuing data elements from lists, the improvement comprising:
   storage means for storing a queue control block and a list head table having a plurality of ranks with each rank representing a priority level and controlling an associated list comprising a plurality of data elements which are stored in said storage means;
   said queue control block including a value B representing a pointer to the table rank from which a dequeue last occurred, a value N representing a count of the priority levels which have enqueued data elements, a value K representing the base address of the table, and a bit map having a binary bit position corresponding to each of said ranks;
   means for applying a data element to said storage means;
   means providing an indication of the priority (P) of a data element applied to said storage means;
   means for summing K, N, B and P to produce an enqueue address representing a rank in said list head table;
   means for applying said enqueue address to said table to enqueue a data element applied thereto; and,
   means connected to said storage means for setting the corresponding bit position in said bit map and incrementing said value N when a data element is first enqueued on a given rank of said table.

2. In a dynamic rank ordered scheduling mechanism for enqueuing elements received from a source external to said mechanism in ranks in a table, or dequeuing elements from said table, the improvement comprising:
   means for storing a table of elements; and,
   means for enqueuing elements in said table at insertion points I defined by the equation $I = B + N + P$ where B is a value representing a pointer to a table rank from which a dequeue last occurred, N is a value representing the number of ranks of the table that have at least one element enqueued therein, and P is a priority value assigned to the element being enqueued.

3. The improvement as claimed in claim 2 and further comprising:
   means for dequeuing elements from said table at a deletion point D where D is the highest order rank in the table that contains an element.

4. The improvement as claimed in claim 3 wherein the means for dequeuing elements comprises:
   means for storing a bit map word having a bit position corresponding to each rank of said table;

means for scanning said bit map word to produce a signal indicating the highest order bit position of said bit map word which is set;

means responsive to said scanning means for producing encoded signals representing said value D;

means responsive to said value D for addressing said table at the rank corresponding to the value D; and, means for storing said encoded signals for subsequent use as said value B.

5. The improvement as claimed in claim 4 and further comprising:

means for sensing when a dequeued element is the last element of its rank in the table;

storage means for storing the value N;

means responsive to said sensing means and said means storing the value N for decrementing the value N when a dequeued element is the last element of its rank in the table; and, means for storing said decremented value N in said storage means.

6. The improvement as claimed in claim 5 and further comprising means responsive to said sensing means and said means storing said bit map word for resetting the bit position of the bit map word corresponding to the rank of a dequeued element when said sensing means senses that the dequeued element is the last element of its rank in the table.

7. The improvement as claimed in claim 4, 5 or 6 wherein said means for scanning said bit map word comprises:

a counter having an individual output for each possible count;

means for incrementing said counter;

a masking circuit including a plurality of logical AND circuits, one for each bit in said bit map word; and, means for applying said bit map word and the outputs from said counter to said masking circuit whereby said masking circuit produces said signal when the count in said counter is equal to the highest order bit position which is set in said bit map word.

8. The improvement as claimed in claim 6 and further comprising:

second sensing means for sensing that an element being enqueued is the first element of its rank to be currently queued;

means responsive to said second sensing means and said means storing the value N for incrementing the value N when an enqueued element is the first element of its rank to be currently queued; and, means for storing said incremented value N in said storage means for storing the value N.

9. The improvement as claimed in claim 8 and further comprising means responsive to said second sensing means and said means storing said bit map word for setting the bit position of the bit map word corresponding to the rank of the element being enqueued when said second sensing means senses that the element being enqueued is the first element of its rank in the table.

10. The improvement as claimed in claim 9 wherein the means for setting and means for resetting a bit position of the bit map word comprises:

means for selectively summing N, B and P to produce a binary code value representing the bit position to be set or reset;

means for decoding the binary coded value to produce an output signal on one of a plurality of output lines, there being one line corresponding to each bit of said bit map word;

a first plurality of Exclusive OR circuits each connected to receive a bit of said bit map word;

a plurality of OR circuits each having a first input connected to receive the output from a corresponding Exclusive OR circuit of said first plurality and a second input connected to one of the output lines of the means for decoding the binary coded value;

a second plurality of Exclusive OR circuits each responsive to a corresponding one of said OR circuits;

means responsive to said first sensing means for selectively applying a control signal to each of the Exclusive OR circuits in both said first and said second plurality of Exclusive OR circuits to thereby complement the inputs thereto when said first sensing means senses that an element being dequeued is the last element of its rank in the table;

said first and said second plurality of Exclusive OR circuits passing the inputs thereto without complementing in the absence of said control signal; and, gating means responsive to said first and second sensing means and said second plurality of Exclusive OR circuits for applying a modified bit map word to the means for storing a bit map word.

11. The method of enqueuing and dequeuing elements in a table having a number of ranks each rank representing a priority level, said method comprising:

inserting elements in the table at an insertion point $I = B + N + P$; and, dequeuing elements from the table at a deletion point D where, D is a value representing the highest order rank in the table that contains an element, N is a value representing the number of ranks of the table having at least one element enqueued therein, P is a priority value assigned to an element being enqueued, and, B is a value representing a pointer to the table position from which the last dequeue occurred.

* * * * *